(12) United States Patent
Funada (10) Patent No.: US 7,884,983 B2
(45) Date of Patent: Feb. 8, 2011

(54) IMAGE DISPLAY BODY AND IMAGE FORMATION METHOD

(75) Inventor: Hiroshi Funada, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 615 days.

(21) Appl. No.: 11/908,520

(22) PCT Filed: Mar. 13, 2006

(86) PCT No.: PCT/JP2006/304882

§ 371 (c)(1),
(2), (4) Date: Sep. 13, 2007

(87) PCT Pub. No.: WO2006/098264

PCT Pub. Date: Sep. 21, 2006

(65) Prior Publication Data

US 2009/0141353 A1 Jun. 4, 2009

(30) Foreign Application Priority Data

Mar. 14, 2005 (JP) .............................. 2005-070567
Mar. 14, 2005 (JP) .............................. 2005-070993

(51) Int. Cl.
*G03H 1/00* (2006.01)
(52) U.S. Cl. ............................................ 359/2; 283/93
(58) Field of Classification Search .................... 359/2, 359/567; 283/86, 93
See application file for complete search history.

(56) References Cited

U.S. PATENT DOCUMENTS

| 4,975,786 | A | * | 12/1990 | Katayama et al. | .......... 358/3.26 |
| 5,340,159 | A | * | 8/1994 | Mowry, Jr. | .................... 283/93 |
| 2004/0080606 | A1 | | 4/2004 | Ishida et al. | |

FOREIGN PATENT DOCUMENTS

| JP | 61-238079 | 10/1986 |
| JP | 62-017784 | 1/1987 |
| JP | 63-030288 | 2/1988 |
| JP | 63-230389 | 9/1988 |
| JP | 08-123299 | 5/1996 |
| JP | 08-328456 | 12/1996 |
| JP | 09-011638 | 1/1997 |
| JP | 09-160475 | 6/1997 |
| JP | 11-227368 | 8/1999 |
| JP | 2002-328213 | 11/2002 |
| JP | 2004-101834 | 4/2004 |

\* cited by examiner

*Primary Examiner*—Alessandro Amari
(74) *Attorney, Agent, or Firm*—Ladas & Parry LLP (57) ABSTRACT

An image display body in which a decorative effect is obtained more effectively by an optical diffraction structure. In an image display body, an optical diffraction structure portion constituted by the optical diffraction structure in a halftone dot state is provided in a colored region on a base material. In the image display body, a dot area percent of a halftone dot a constituting the optical diffraction structure portion to the colored region ranges from 15% to 60%, an area of each halftone dot a is smaller than 0.25 mm$^2$. The halftone dots 21*a* are diffused by an error diffusion method.

2 Claims, 13 Drawing Sheets

IMAGE DISPLAY BODY AND IMAGE FORMATION METHOD

TECHNICAL FIELD

The present invention relates to an image display body in which an optical diffraction structure is formed in a halftone dot state and an image information method for the image display body.

BACKGROUND ART

A transfer foil having an optical diffraction structure forming layer is utilized for the purposes of improving design performance and security performance. The optical diffraction structure having a fine concavo-convex relief structure such as a hologram and a diffraction grating is formed in the optical diffraction structure forming layer. There is a known method of coloring the optical diffraction structure in order to improve the design performance and the security performance. For example, there is a known colored layer transfer material having a fine relief structure and a reflecting layer made of a metal colored a unique color (For example, see Patent Documents 1 and 2), as a colored layer transfer material to obtain an effect of looking like a colored optical diffraction structure (hereinafter sometimes referred to as "colored hologram"). The inventor also discloses a layer configuration, in which the optical diffraction structure forming layer and the reflecting layer are laminated and a colored layer is added to an observation side to the reflecting layer in order to obtain the effect of looking like the colored hologram (For example, see Patent Documents 3 and 4).

There is a known colored layer transfer material having the colored layer and the metal layer (the reflecting layer) and sensuously looking like, for example, gold (For example, see Patent Documents 5 to 7), as the colored layer transfer material which can be transferred onto a transfer body to obtain a colored-metal glossy color. However, in the above colored layer transfer materials, because the fine concavo-convex relief structure such as a hologram and a diffraction grating which exerts the optical diffraction effect is not provided, the particular design or the optical effect cannot be obtained.

On the other hand, there is also a known method of forming an optical diffraction structure portion having optical diffraction structure in a halftone dot state to add a decorative effect by diffracted light to an image, by transferring the optical diffraction structure in a halftone dot state onto a base material having a predetermined image (For example, see Patent Documents 8 to 10).

Patent Document 1: Japanese Patent Laid-Open No. 09-160475
Patent Document 2: Japanese Patent Laid-Open No. 08-328456
Patent Document 3: Japanese Patent Laid-Open No. 61-238079
Patent Document 4: Japanese Patent Laid-Open No. 62-17784
Patent Document 5: Japanese Patent Laid-Open No. 63-30288
Patent Document 6: Japanese Patent Laid-Open No. 63-230389
Patent Document 7: Japanese Patent Laid-Open No. 09-11638
Patent Document 8: Japanese Patent Laid-Open No. 08-123299
Patent Document 9: Japanese Patent Laid-Open No. 11-227368
Patent Document 10: Japanese Patent Laid-Open No. 2004-101834

DISCLOSURE OF THE INVENTION

Problems to be Solved by the Invention

However, in the method of configuring the reflecting layer by using the metal colored the unique color, due to the use of an alloy having its unique color, it is very difficult that continuous deposition is performed while a desired compound ratio of the alloy is stably kept. It takes a lot of time to provide an exchange a predetermined alloy material during the deposition, that could cause a risk of contamination (pollution with the material used before and after) is generated, and thereby the method of forming the reflecting layer with the metal colored the intrinsic color has a cost disadvantage.

In the method of adding and providing the colored layer, basically the colored layer transfer material has a single color, and it is impossible to color the optical diffraction structure plural desired colors. For example, it is difficult to color plural portions of the optical diffraction structure different colors such as gold, a sapphire tone, an emerald tone, and a ruby tone. Accordingly, there is no colored layer transfer material having a low cost, good productivity, good storage stability of a color tone, and the optical diffraction effect by the optical diffraction structure.

Additionally, in the conventional method of transferring the optical diffraction structure in the halftone dot state, a visual synergic effect obtained by the diffracted light of the optical diffraction structure portion and the color of a region located below the optical diffraction structure portion is hardly considered. Accordingly, it sometimes happens that almost of the colored region is covered with the transferred optical diffraction structure.

Even if the case where the above synergic effect is considered, in the conventional transfer method, brightness by the diffracted light of the optical diffraction structure portion frequently becomes unnatural, and the synergic effect is not sufficiently exerted.

In view of the foregoing, an object of the invention is to provide an image display body in which the optical diffraction structure appears to be colored a desired color and whereby the decoration effect is obtained more effectively, and an image formation method for the image display body. Another object of the invention is to provide an image display body in which the decoration effect is provided more effectively in the image by the optical diffraction structure and an image formation method for the image display body.

Means for Solving the Problems

A first image display body of the present invention solves the above problems as an image display body in which an optical diffraction structure portion constituted by optical diffraction structure in a halftone dot state is provided in a colored region on a base material, wherein a dot area percent of the halftone dots constituting the optical diffraction structure portion to the colored region ranges from 15% to 60%, an area of each halftone dot is smaller than 0.25 mm$^2$, and the halftone dots are diffused to be provided by an error diffusion method.

The inventor has discovered that natural brightness based on diffracted light can be given evenly to the colored region by providing the halftone dots constituting the optical diffraction structure portion on the colored region in the state where the halftone dots are diffused by an error diffusion method under conditions of the above dot area and the above dot area percent. By the present invention, as the brightness can be given evenly to the colored region, the colored region where the optical diffraction structure portion of the present invention is formed can be used such as a colored optical diffraction structure.

In the present invention, the optical diffraction structure includes a diffraction grating having a constant concavo-convex pattern and a hologram where a fringe pattern generating a predetermined hologram image is formed. It doesn't matter which error diffusion method is employed to the present invention, such as a random dithering method, Floyd&Steinberg type, and Judice&Ninke type. Also, it doesn't matter which printing method is taken for the colored region of the present invention. Moreover, the colored region may be colored a single color. Thereby, the colored region where the optical diffraction structure is formed can be used as a single-colored optical diffraction structure colored the color of the colored region.

A first image formation method of the present invention solves the above problems as an image formation method in which an optical diffraction structure forming layer is transferred in a halftone dot state to a colored region on a transfer body to form an optical diffraction structure portion by using a transfer sheet where the optical diffraction structure forming layer in which an optical diffraction structure is formed is laminated on a base material sheet thereof, wherein the halftone dots constituting the optical diffraction structure portion are transferred to the colored region in a diffused state by an error diffusion method so that an area of the halftone dot is smaller than 0.25 mm$^2$ and a dot area percent to the colored region ranges from 15% to 60%.

By the above formation method, the first image display body of the present invention can be obtained. The conceptions of the optical diffraction structure and the error diffusion method are the same as the above mentioned conceptions.

The optical diffraction structure forming layer may be thermally transferred from the transfer sheet to the colored region by using a thermal head, and each of the halftone dots may be transferred based on printing energy applied to the thermal head so that the halftone dots are diffused in a state of the area and the dot area percent by the error diffusion method. Thereby, the printing energy of the thermal head can be optimized based on materials of the optical diffraction structure and the transfer body. As each halftone dot is transferred based on the optimized printing energy, the image display body having more natural brightness can be obtained.

the colored region of the transfer body may be colored a single color. Thereby, by the present invention, the colored region where the optical diffraction structure is formed can be used as a single-colored optical diffraction structure colored the color of the colored region.

A second image display body of the present invention solves the above problems as an image display body in which an optical diffraction structure portion constituted by optical diffraction structure in a halftone dot state is formed on an image on a base material, wherein, each of a plurality of halftone dots constituting the optical diffraction structure portion is formed such that each of the halftone dots is enclosed in each of same size square regions a side of which is 400 μm or less, and when each of the halftone dots is enclosed in each of the square regions, the plurality of square regions are arranged at equal intervals in a diagonal direction, and in the diagonal direction a distance between a corner of one of adjacent square regions and a corner of another of the adjacent square regions is 220 μm or less.

the inventor finds out the fact that optical diffraction structure can be provided to an image as more naturally decorative effect as a lame when the halftone dots constituting the optical diffraction structure portion are formed such that the halftone dots are arranged regularly. Thereby, such the effect as a glittery lame can be easily given to the image printed with natural ink.

It is not necessary that the shape of the halftone dot is a square as long as the halftone dot can be enclosed in the square region the side of which is 400 μm or less. For example, a circle shape, an ellipse shape, a polygon shape or an irregular shape can be employed as the halftone dot. The optical diffraction structure includes a diffraction grating having a constant pattern and a hologram having a fringe pattern forming a predetermined image.

Moreover, in the second image display body of the present invention, a dot area percent of the optical diffraction structure portion may be 40% or less. In a case of this halftone dot area percent, such the effect as a more natural glitter lame can be given to the image. When a length of one side of the square region ranges from 100 μm to 200 μm, and/or a distance between the adjacent square regions ranges from 50 μm to 150 μm, a furthermore decorative effect can be performed.

A second image formation method solves the above problems as an image formation method in which an optical diffraction structure portion constituted by optical diffraction structure is formed in a halftone dot state on a predetermined image by using a transfer sheet where the optical diffraction structure is laminated on a base material sheet thereof, wherein each of a plurality of halftone dots constituting the optical diffraction structure portion is formed such that each the plurality of halftone dots is enclosed in each of same size square regions a side of which is 400 μm or less, and when each of the halftone dots is enclosed in each of the square regions, the plurality of square regions are arranged at equal intervals in a diagonal direction, and in the diagonal direction a distance between a corner of one of adjacent square regions and a corner of another of the adjacent square regions is 220 μm or less.

EFFECTS OF THE INVENTION

As described above, according to the invention, the diffraction structure in a halftone dot state is provided to the colored region under the conditions that the area of each halftone dot is smaller than 0.25 mm$^2$, the dot area percent ranges from 15% to 60%, and the halftone dots are diffused by the error diffusion method. Thereby, the image display body and the like in which the optical diffraction structure appeared to be colored the desired color, and the decorative effect is obtained more effectively can be provided. Moreover, by specifying the mode where halftone dots are arranged on an image in a size and a distance, the image display body and the like where more decorative effect by an optical diffraction structure is given to the image can be provided

BEST MODE FOR CARRYING OUT THE INVENTION

Figure 1:
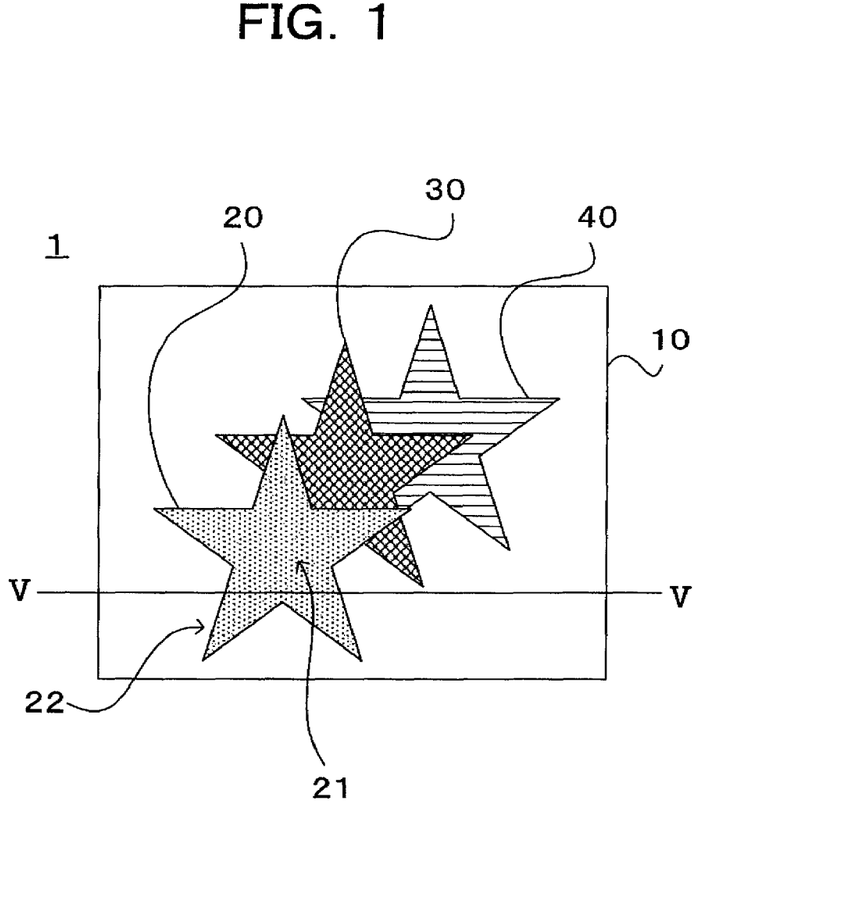
FIG. 1 is a view showing an example of the first image display body of the present invention.

FIG. 1 is a view showing an example of the first image display body 1 of the present invention. The image display body 1 includes plural colored portions 20, 30, and 40 on a base material 10. The colored portions 20, 30, and 40 are colored the different colors respectively. In the whole of the colored portion 20, an optical diffraction structure in a halftone dot state is provided as an optical diffraction structure portion 21. Therefore, a visual effect by diffracted light is given to the colored portion 20 in addition to the coloring. Hereinafter the colored portion 20 in the state in which the optical diffraction structure portion 21 is provided is referred to as colored hologram portion 22. Although the colored portions 20, 30, and 40 are colored by a dye sublimation printing in the present embodiment, any printing method may be employed to color the colored portions 20, 30, and 40.

In the present embodiment, a diffraction grating is used as the optical diffraction structure constituting the optical diffraction structure portion 21. The optical diffraction structure includes the diffraction grating and a hologram, and the diffraction grating constituted by a constant concavo-convex pattern is strictly distinguished from the hologram constituted by a fringe pattern generating a predetermined hologram image. However, hereinafter the hologram is used in the same meaning of the optical diffraction structure. Materials respectively used for the base material 10 and colored portion 20 may be appropriately determined according to a use purpose of the image display body 1. Any type of hologram may be used in the optical diffraction structure portion 21 as long as a hologram is a diffraction grating which can be formed as a hologram forming layer onto a later-mentioned hologram transfer sheet.

Figure 2:
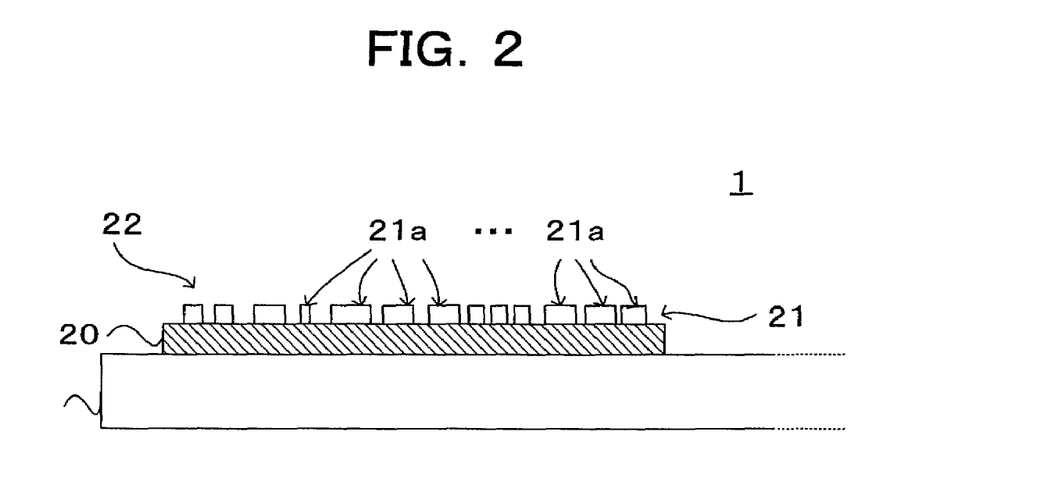
FIG. 2 is a sectional view taken along a line V-V of FIG. 1.

As shown in FIG. 2, the colored portion 20 constituted with ink is laminated on the base material 10 in the colored hologram portion 22 of the image display body 1, and plural halftone dots 21a, ..., 21a constituting the optical diffraction structure portion 21 are provided all over the colored portion 20. An area of each halftone dot 21a is smaller than 0.25 mm$^2$, and a halftone dot area percent to the colored hologram portion 22 ranges from 15% to 60%. The halftone dots 21a are provided while diffused by an error diffusion method, namely, the halftone dots 21a are provided not in a state where the halftone dots having a constant shape are regularly arranged at equal intervals, but in a state where the uneven halftone dots are unevenly disposed.

Figure 3:
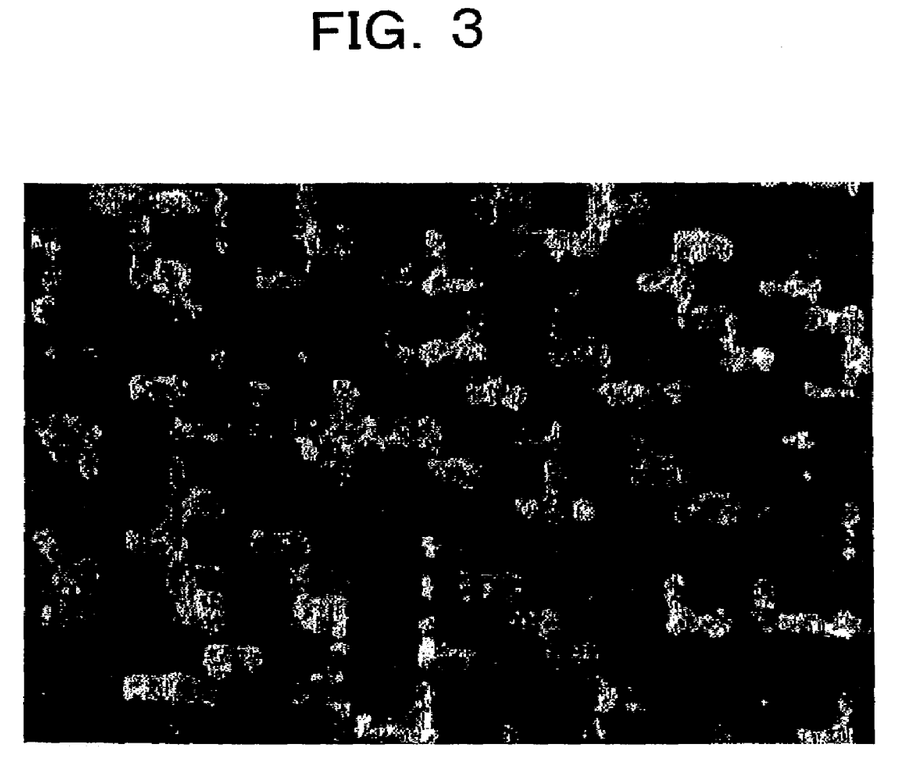
FIG. 3 is an enlarged view of a colored hologram portion which is formed with dot area percent of 15%.
Figure 4:
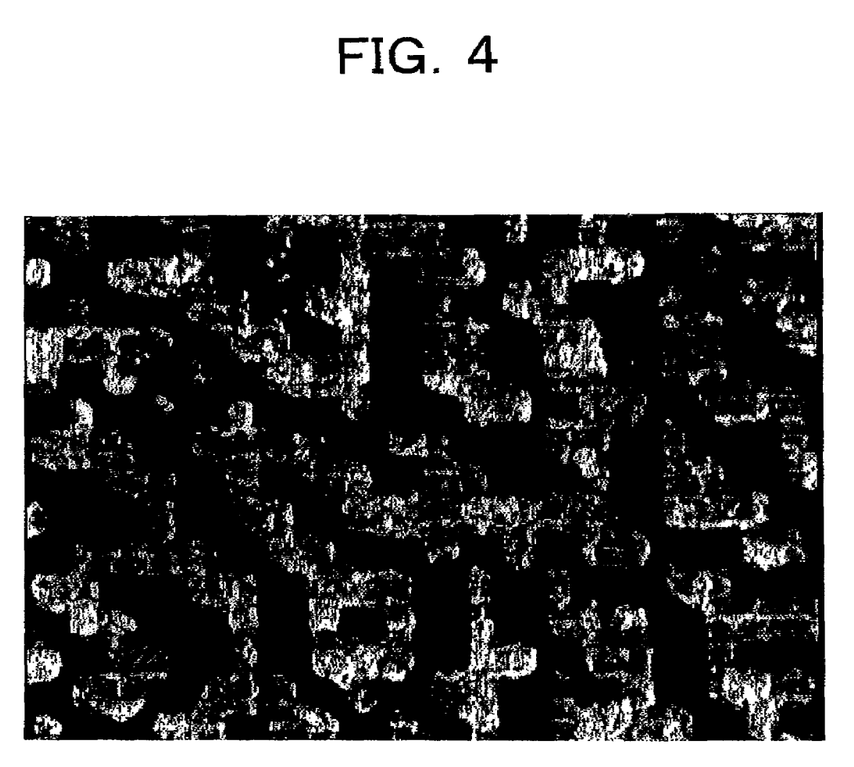
FIG. 4 is an enlarged view of a colored hologram portion which is formed with dot area percent of 35%.
Figure 5:
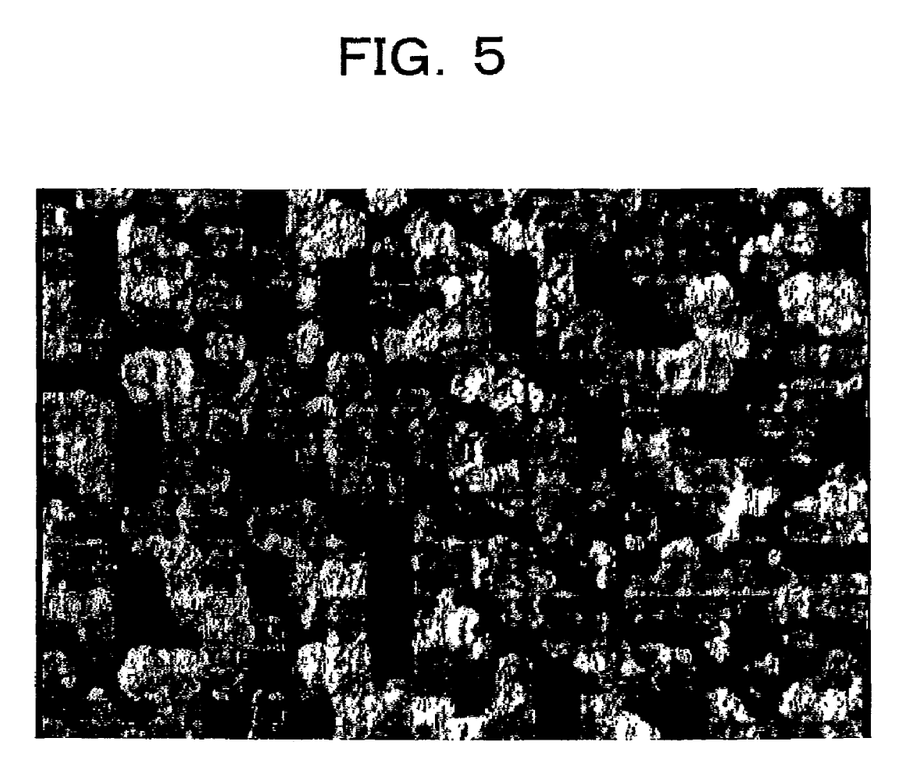
FIG. 5 is an enlarged view of a colored hologram portion which is formed with dot area percent of 60%.

The plural halftone dots 21a, ..., 21a constituting the optical diffraction structure portion 21 are provided in the colored portion 20 under the above conditions, whereby natural brightness by the diffracted light is represented in all over the colored hologram portion 22, and the colored hologram portion 22 looks like a hologram colored the color of the colored portion 20. For example, in the case where the colored portion 20 is colored red, the colored hologram portion 22 looks like the hologram colored red. FIGS. 3 to 5 show the states in which the plural halftone dots 21a are provided in the colored portion 20 with dot area percents of 15%, 35%, and 60% respectively. In each drawing, a whitish portion is a portion where the halftone dot 21a is provided.

Figure 6:
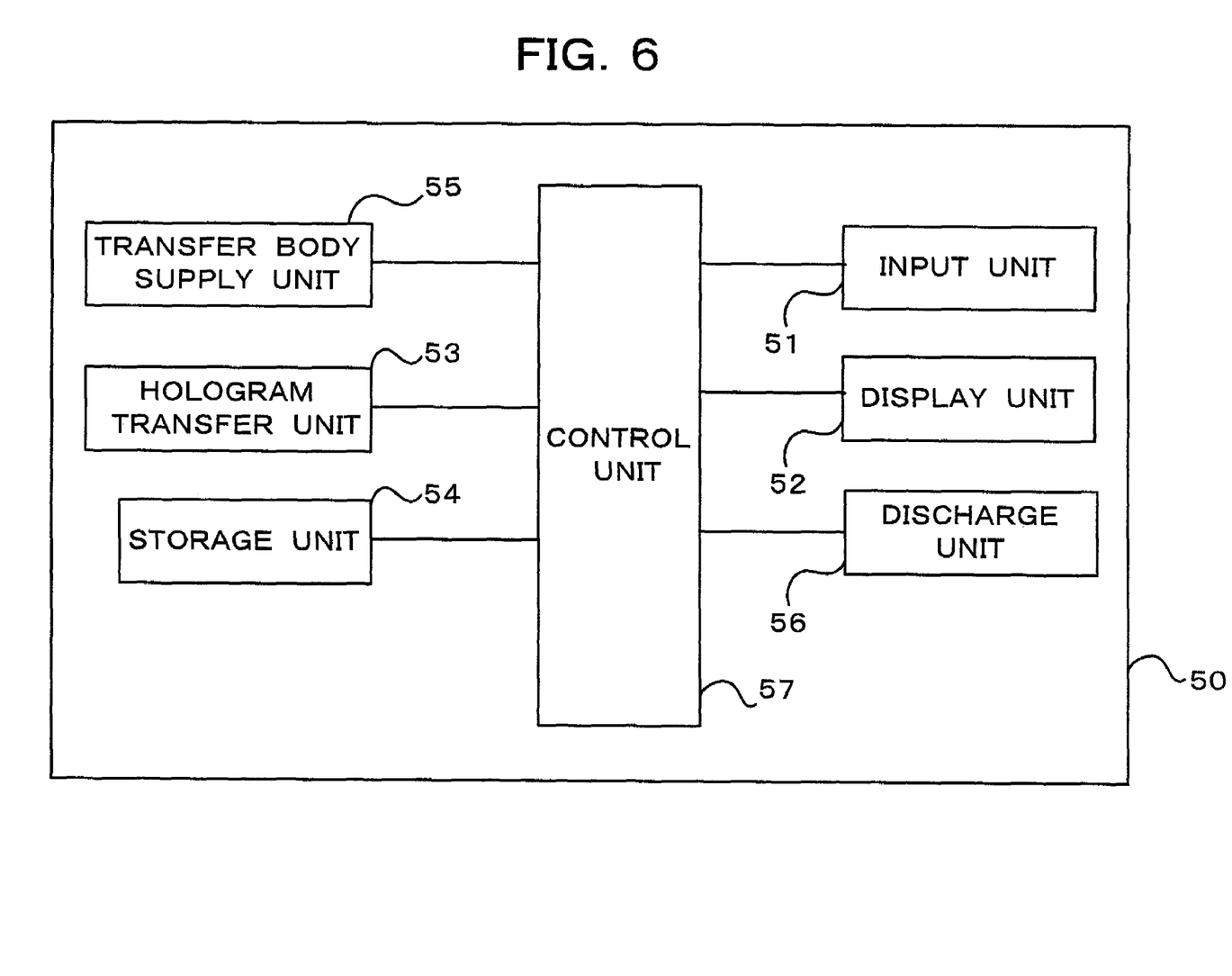
FIG. 6 is a view showing an image producing apparatus of the present mode.

Then, a method of producing the image display body 1 will be described. In the present embodiment, the image display body 1 is produced with an image producing apparatus 50 shown in FIG. 6. The image producing apparatus 50 includes an input unit 51, a display unit 52, a hologram transfer unit 53, a storage unit 54, a body where to be transferred supply unit 55, a discharge unit 56, and a control unit 57. The input unit 51 accepts various kinds of setting operations of a user. The display unit 52 displays an image corresponding to the setting by the user or various messages to the user. The hologram transfer unit 53 transfers the hologram. Various kinds of drawing patterns and various kinds of information to be provided on the base material 10 are stored in the storage unit 54. The transfer body supply unit 55 supplies a transfer body. The discharge unit 56 discharges the produced image display body 1. The control unit 57 controls operations of the units 51, ..., 56.

Figure 7:
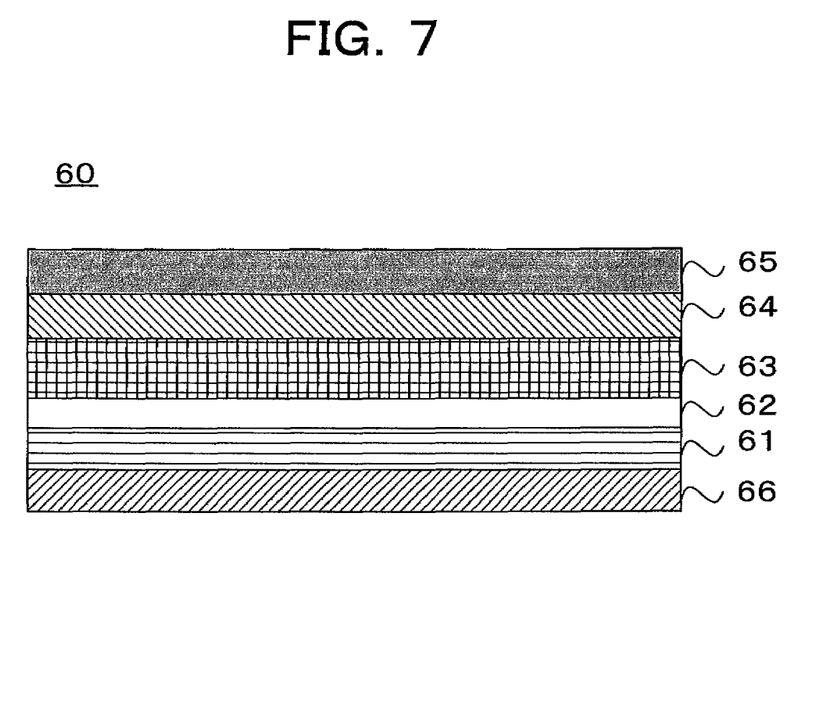
FIG. 7 is a sectional view of a hologram transfer sheet used in the image producing apparatus of FIG. 6.

The hologram transfer unit 53 of the present embodiment prints the hologram by using a hologram transfer sheet 60 shown in FIG. 7 by a thermal transfer method. In the hologram transfer sheet 60, a peel layer 62, a hologram forming layer 63 in which the hologram is formed, a reflecting layer 64, and a bonding layer 65 are laminated on one side of a base material sheet 61, while a heat-resistant layer 66 is provided on the other side of the base material sheet 61. The hologram transfer sheet 60 of the present embodiment is a transfer foil in which the diffraction grating is formed as the hologram of the hologram forming layer 63.

The bonding layer 65 is bonded to the transfer body, and a thermal head is pressed against the hologram transfer sheet 60 from the side of the heat-resistant layer 66, which peels off the side of the base material sheet 61 from the side of the hologram forming layer 63 to transfer the hologram forming layer 63 onto the transfer body. Each of the layers 61, ..., 66 may be made of well-known materials. An aspect in which the hologram forming layer 63 is transferred onto the transfer body includes an aspect in which the hologram transfer sheet 60 is peeled off between the base material sheet 61 and the peel layer 62 to transfer the layers 62 to 65 including the hologram forming layer 63 onto the transfer body, an aspect in which the hologram transfer sheet 60 is peeled off between the peel layer 62 and the hologram forming layer 63 to transfer the layers 63 to 65 including the hologram forming layer 63 onto the transfer body, and an aspect in which the hologram transfer sheet 60 is peeled off at the peel layer 62 into the side of the hologram forming layer 63 and the side of the base material sheet 61 to transfer the hologram forming layer 63 onto the transfer body.

A relief diffraction effect can be enhanced by providing the reflecting layer 64 to a relief surface of the hologram forming layer 63. Desirably, the reflecting layer 64 is made of a metal having a high light reflectance. The higher light reflectance of the metal constituting the reflecting layer 64 is, the brighter diffracted light is obtained. Specifically, the reflecting layer 64 may be formed by a single thin film made of a metal such as Cr, Ni, Ag, Au, and Al, an oxide, a sulfide, and a nitride thereof, and a combination thereof. The metal thin film having the high light reflectance has a thickness ranging from around 10 to 2000 nm, preferably from 20 to 1000 nm so as to obtain a sufficient reflecting effect.

Figure 8:
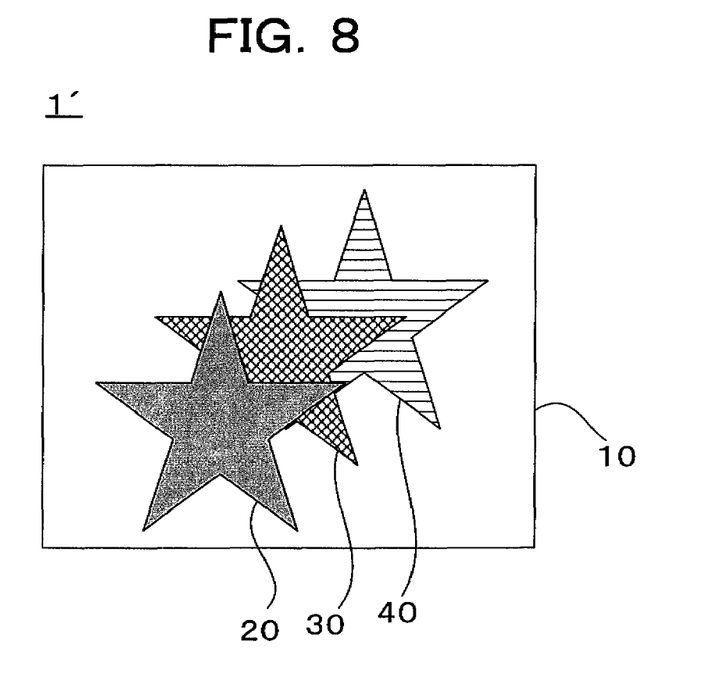
FIG. 8 is a view showing a state in which a colored portion is provided in a base material.

In the present embodiment, an image display body 1' shown in FIG. 8 is used as the transfer body. In the image display body 1', the plural colored portions 20, 30, and 40 are provided on the base material 10. Although the coloring of the colored portions 20, 30, and 40 is printed by the dye sublimation method, the colored portions 20, 30, and 40 may be colored by other printing methods. In the transfer body supply unit 55, plural variations colored different colors are prepared as the colored portions 20, 30, and 40.

Figure 9:
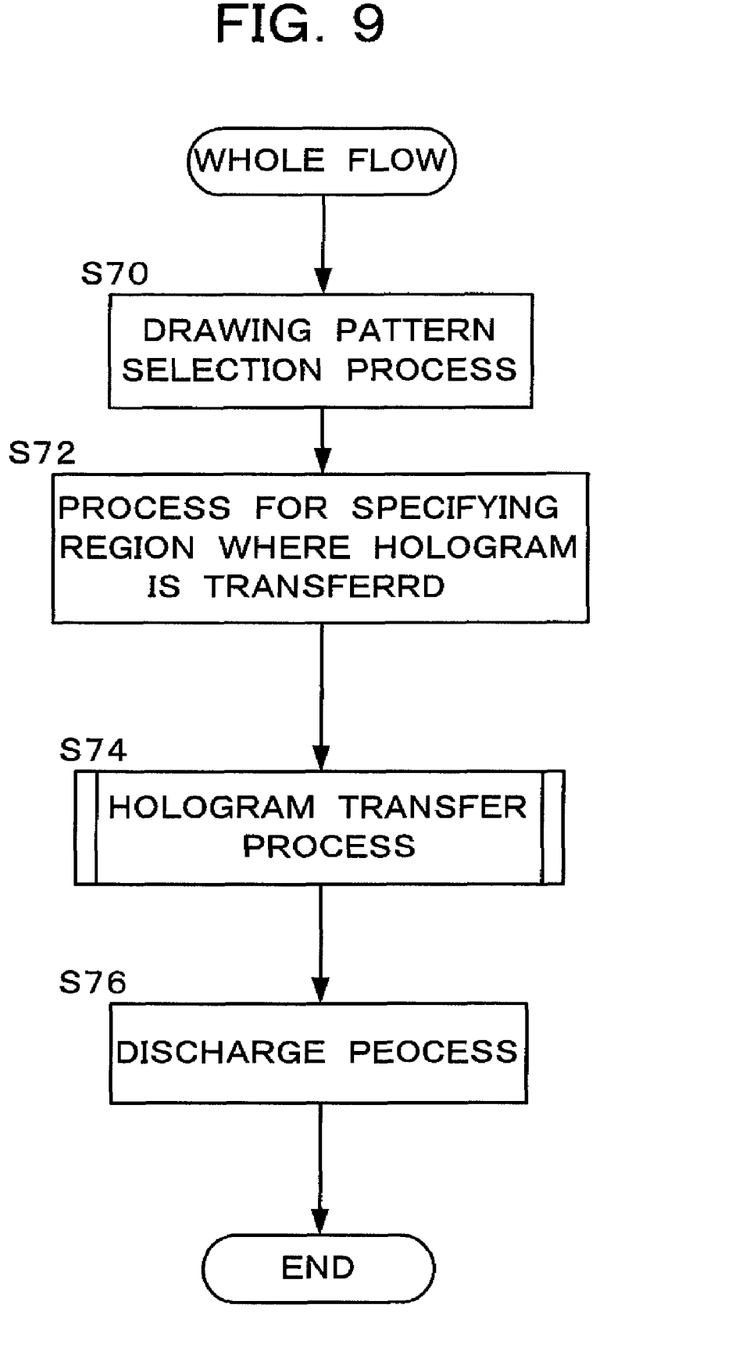
FIG. 9 is a flowchart showing a flow of processes for producing an image display body.

The flow of whole processes for producing the image display body 1 with the image producing apparatus 50 will be described with reference to a flowchart of FIG. 9. Each process in the flowchart of FIG. 9 is performed by the control unit 57 according to a predetermined program. First a drawing pattern selection process is performed (Step S70). In the drawing pattern selection process, the process lets the user select his/her desiring colored drawing-pattern to be provided on the base material 10. For example, the plural selectable colored drawing-patterns are displayed on the display unit 52, and the input unit 51 accepts the user selection operation.

The image display body 1' is displayed on the display unit 52 according to the user selection operation during the drawing pattern selection process. At this point, sizes and positions of the colored portions 20, 30, and 40 may be appropriately changed by the input operation of the user. When the drawing pattern selection process is finished, the process lets the user specify a region where the hologram is transferred in the image display body 1' (Step S72). In the present embodiment, the process lets the user select the drawing pattern onto which the hologram is transferred in the image display body 1'. The case in which the colored portion 20 of the image display body 1' is selected will be described below. When the colored portion 20 is specified as the region to which the hologram is transferred, a hologram transfer process is performed (Step S74). In the hologram transfer process, the optical diffraction structure portion 21 is formed in the colored portion 20 to produce the image display body 1. The specific process of the hologram transfer process is described later. Finally the produced image display body 1 is discharged from the discharge unit 56 (Step S76), and the processes concerning producing of the image display body 1 finishes.

Figure 10:
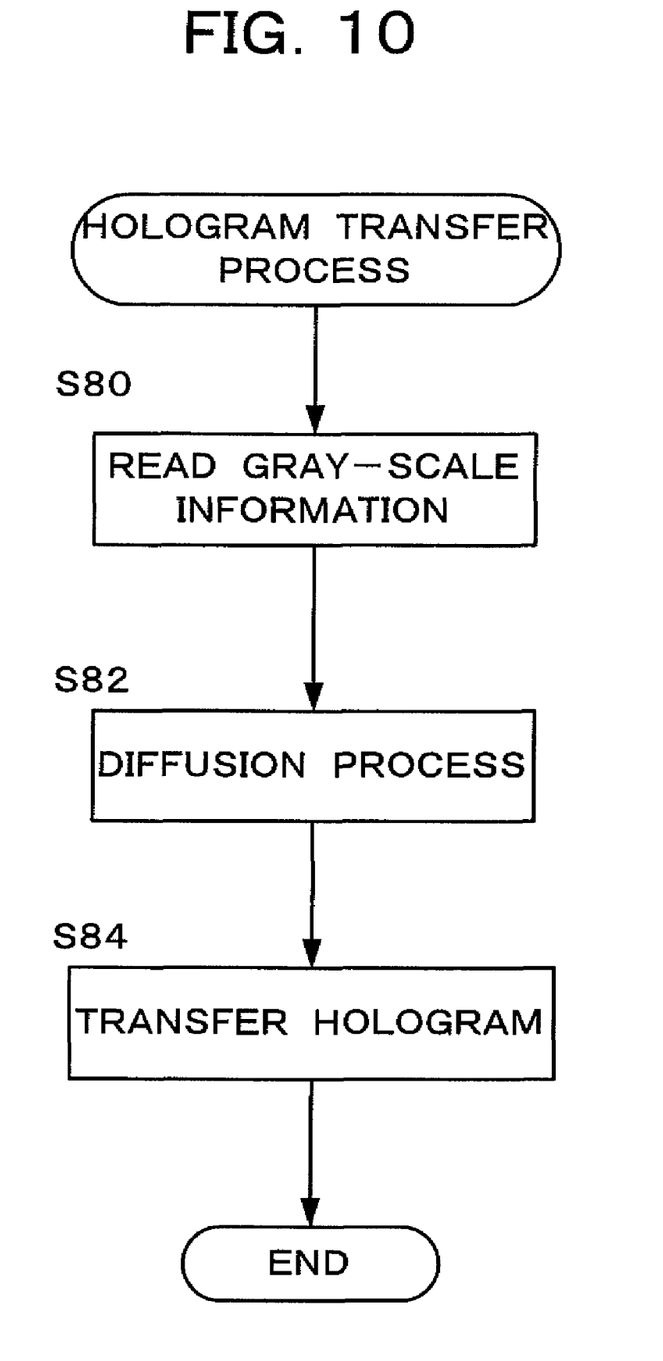
FIG. 10 is a flowchart showing a flow of a hologram transfer process.

The hologram transfer process will be specifically described with reference to a flowchart shown in FIG. 10. When the colored portion 20 is specified as the region where the hologram is transferred, gray-scale information is read from the storage unit 54 (Step S80). The gray-scale information means a proportion of an area which the hologram occupies to a predetermined region, e.g. one dot, when the hologram is transferred. The gray-scale information is set as a value of printing energy given to the thermal head. The optimum value of the gray-scale information is previously set according to the material constituting the hologram of the hologram forming layer 63 and the image display body 1', and the use application of the image display body 1. The optimum value of the gray-scale information is stored in the storage unit 54.

Then, a diffusion process is performed based on the gray-scale information (Step S82). In the diffusion process, on the basis of the gray-scale information, the position and size of the halftone dot 21a provided as the optical diffraction structure portion 21 on the colored portion 20 so that the predetermined conditions are satisfied. Hereinafter the information on the halftone dot 21a determined in the diffusion process is referred to as halftone dot information. The predetermined conditions mean the area of the halftone dot, the dot area percent to the colored portion 20, and the process performed by the error diffusion method. In the present embodiment, the halftone dot information on each halftone dot 21a is computed such that the halftone dot 21a has the area of 0.04 mm$^2$, the dot area percent is 30%, and the halftone dots 21a are arranged in a state of being diffused by a random dithering method which is one of the error diffusion methods.

The area of the halftone dot 21a may be smaller than 0.25 mm$^2$, and the dot area percent may range from 15% to 60%. The error diffusion method is not limited to the random dithering method, but any method may be employed. Appropriate values of the area and dot area percent are previously set according to the use purpose of the image display body 1.

Figure 11:
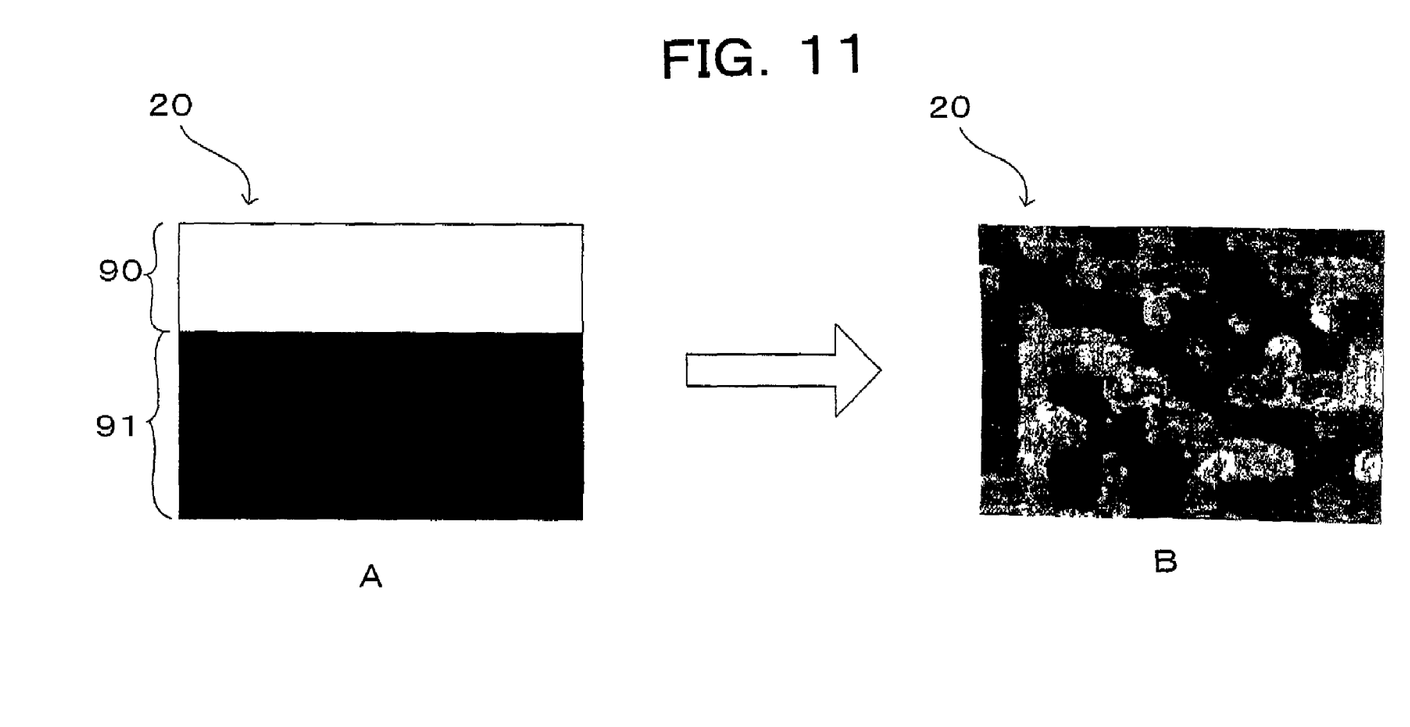
FIG. 11 is a view showing a state in which halftone dot information is obtained from gray-scale information.

A method of obtaining the halftone dot information using the gray-scale information will be described with reference to FIG. 11. As described above, the gray-scale information is the proportion of the area which the hologram can occupy to the predetermined region. For example, when the case of the gray-scale information of 35% about the colored portion 20 is conceptually shown, as a pre-diffusion process state A, a white region 90 where to transfer the hologram occupies 35% of the whole of the colored portion 20, and a black region 91 where not to transfer the hologram occupies the other 65%. By diffusing the white region 90 where to transfer the hologram in the uneven halftone dot state by the error diffusion method while satisfying the above conditions, the halftone dot information on each halftone dot 21a is computed. A post-diffusion process state B of FIG. 11 shows a state where the diffusion is performed at the dot area percent of 35% in the colored portion 20 which is a rectangular shape.

Returning to FIG. 10, when the halftone dot information is obtained through the diffusion process, the thermal head operation is controlled based on the halftone dot information, and the hologram forming layer 63 is thermally transferred from the hologram transfer sheet 60 onto the colored portion 20 in the halftone dot state in the above-described manner (Step S84). Thereby the optical diffraction structure portion 21 can be provided on the colored portion 20.

Figure 12:
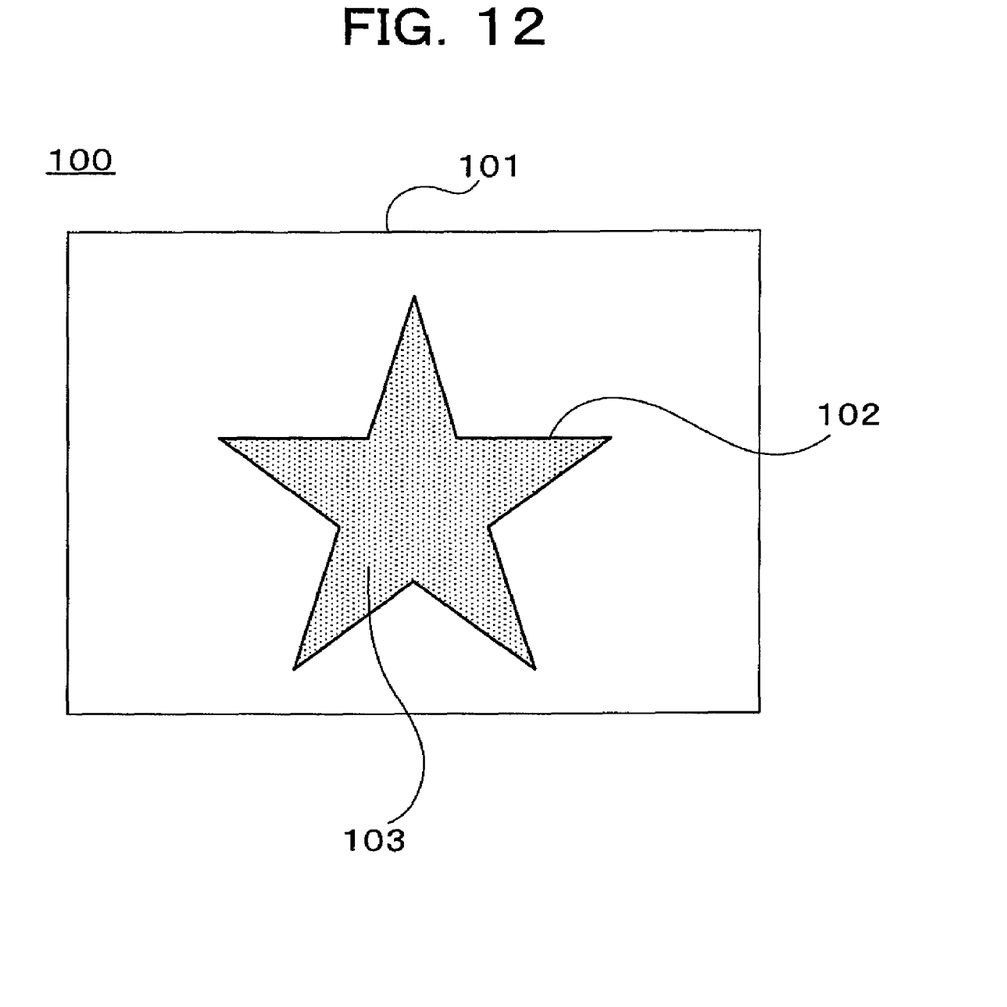
FIG. 12 is a view showing an example of the second image display body in the present invention.
Figure 13:
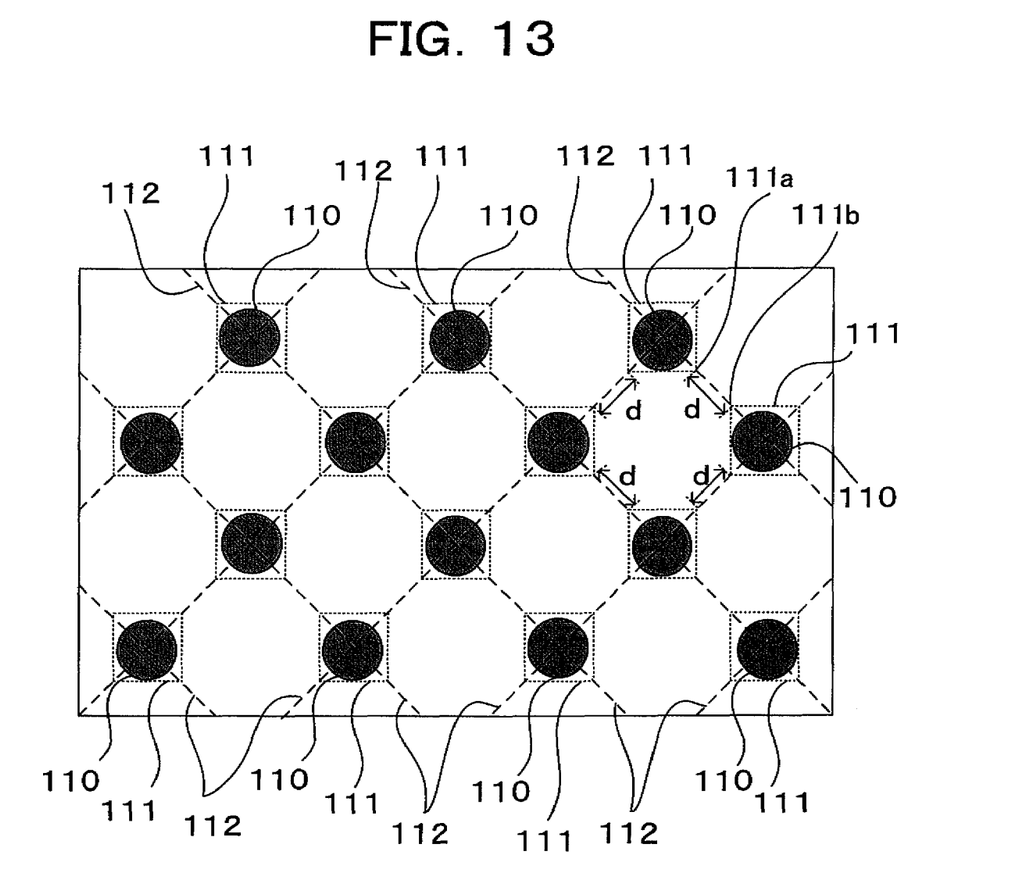
FIG. 13 is a partially enlarged view of an optical diffraction structure portion shown in FIG. 12.

FIG. 12 is a view showing an example of a second image display body 100 of the present invention. In the image display body 100, an optical diffraction structure portion 103 constituted by optical diffraction structure is formed in a halftone dot state on an image 102 provided to a predetermined base material 101. As shown in FIG. 13, each of plural halftone dots 110, . . . , 110 constituting the optical diffraction structure portion 103 can be enclosed by each of square regions 111, . . . , 111 whose sizes are equal to one another, and the plural square regions 111, . . . , 111 are formed so as to be arranged at equal intervals in diagonal directions 112, . . . , 112.

A length of one side of the square region 111 may be 400 μm or less, and preferably the length ranges from 100 to 200 μm. In the adjacent square regions 11 and 11, all distances d between a corner 11a of one of the square region 11 and a corner 11b of the other square region 11 are equal to one another and should be 220 μm or less. Preferably the distance d ranges from 50 to 150 μm. Moreover, Preferably the dot area percent of the halftone dots 110, . . . , 110 to the area of the image 102 is 40% or less.

The material for the base material 101 and the method of forming the image 102 may be appropriately determined according to the use application of the image display body 100. Examples of the image display body 100 include cards such as a credit card, an ID card, and a prepaid card and paper tickets such as an exchange coupon, a check, paper money, a stock certificate, an entrance ticket, and various certificates. Any card or paper ticket can be used as the image display body 100 as long as the card or paper ticket has the image 102 on the base material 101. The image 102 also includes a substance formed by various kinds of printing methods and a photograph.

Figure 14:
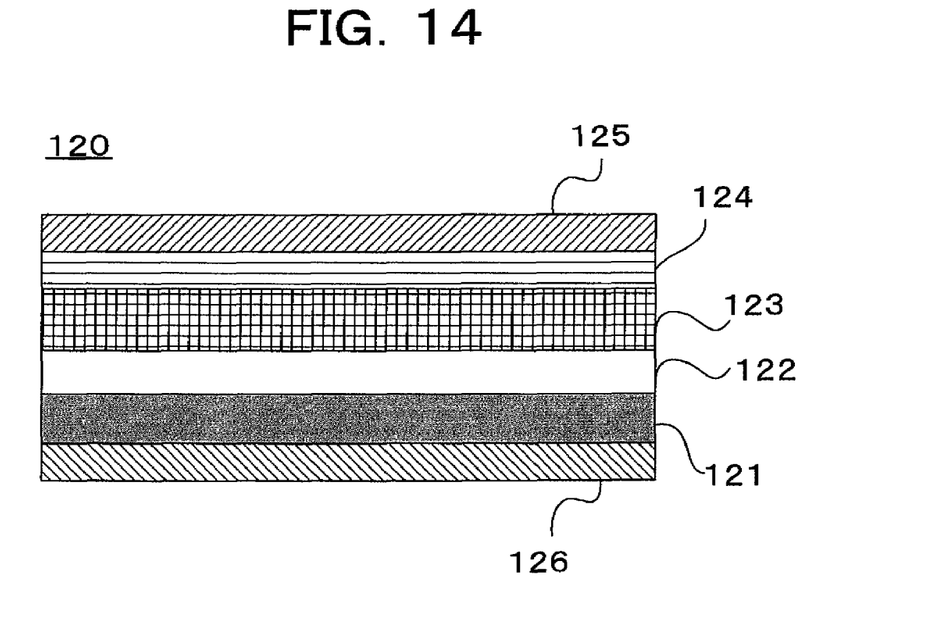
FIG. 14 is a view showing a section of an example of a transfer sheet in the present invention.

Then, a method of forming the optical diffraction structure portion 103 in the image 102 by using a transfer sheet 120 shown in FIG. 14 will be described. In the transfer sheet 120, a peel layer 122, an optical diffraction structure layer 123, a reflecting layer 124, and a bonding layer 125 are laminated on a base material sheet 121, and a heat-resistant protective layer 126 is formed on the backside of the base material sheet 121. In the optical diffraction structure layer 123, the concavo-convex pattern of the diffraction grating is formed as the optical diffraction structure. The relief diffraction effect can be enhanced by providing the reflecting layer 124 on the relief surface of the optical diffraction structure layer 123. Desirably the reflecting layer 124 is made of a metal having the high light reflectance. The higher light reflectance of the metal constituting the reflecting layer 124 is, the brighter diffracted light is obtained. Specifically, the reflecting layer 124 may be formed by a single thin film made of a metal such as Cr, Ni, Ag, Au, and Al, an oxide, a sulfide, or a nitride thereof, or a combination thereof. The metal thin film having the high light reflectance has a thickness ranging from around 10 to 2000 nm, preferably from 20 to 1000 nm so as to obtain the sufficient reflecting effect.

Figure 15A:
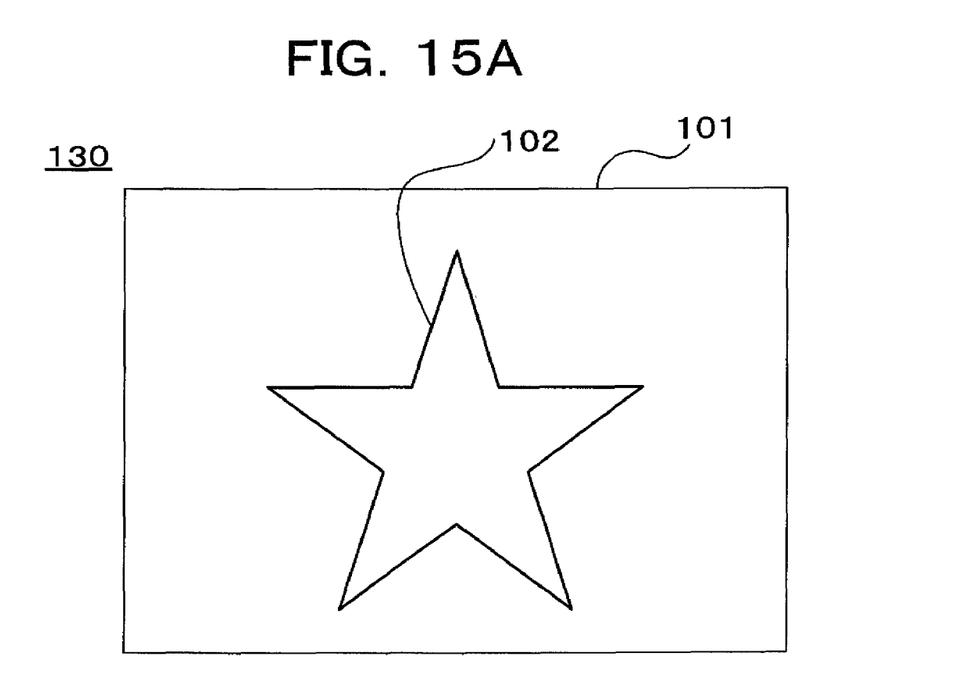
FIG. 15A is a view showing a transfer body in which the image display body shown in FIG. 12 is formed.

The thermal transfer printer transfers the optical diffraction structure layer 123 of the transfer sheet 120 to a transfer body 130 in which the image 102 is provided to the base material 101 as shown in FIG. 15A. By controlling the thermal head operation of the thermal transfer printer, the halftone dots 110, . . . , 110 can be formed on the image 102 in the above mentioned state by the optical diffraction structure layer 123.

Figure 15B:
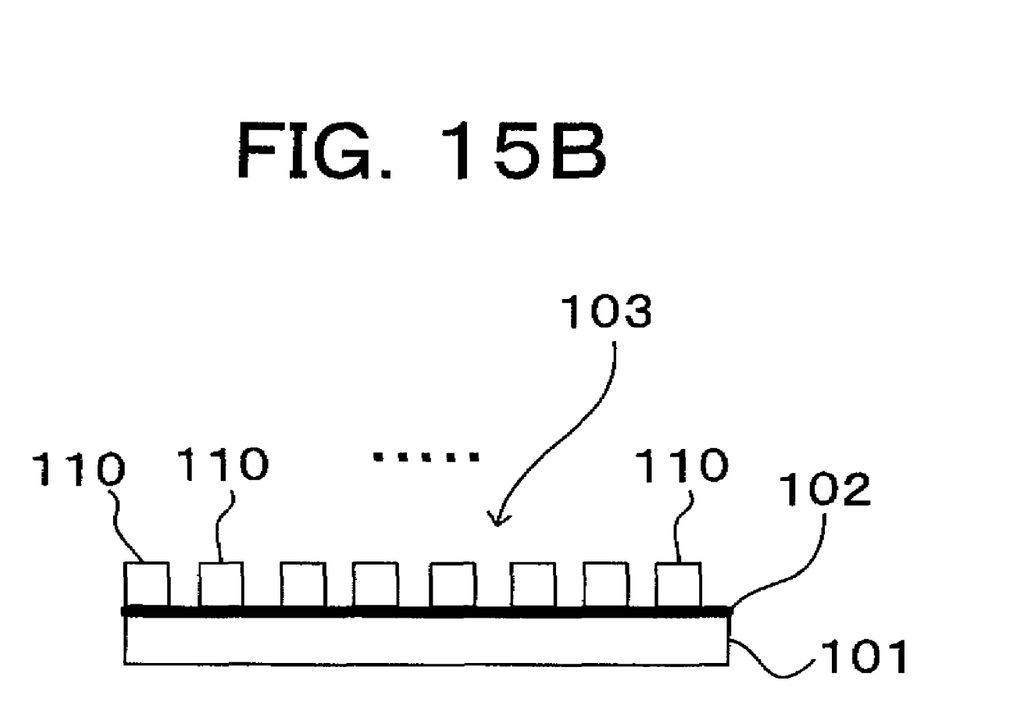
FIG. 15B is a partially enlarged sectional view of the image display body shown in FIG. 12, in which the optical diffraction structure portion is formed.

The conventional method in which the optical diffraction structure is transferred in a halftone dot state from the transfer sheet with the thermal transfer printer may be employed as the method of controlling the thermal head operation. FIG. 15B is a view showing the state in which the optical diffraction structure portion 103 is formed by transferring the optical diffraction structure layer 123 as the halftone dots 110, . . . , 110 onto the image 102 provided to the base material 101. Through the above forming method, the optical diffraction structure portion 103 is formed on the image 102, and a natural lame effect can be given to the image 102 by the diffracted light.

The present invention relating to the first image display body 1 is not limited to the above-described embodiment, and the present invention can be realized in various embodiments. At least one colored portion of the image display body 1 may be required, and the whole of the image display body 1 may be colored. The colors of the plural colored portions may be different from one another or identical to one another. The shape of the colored portion 20 of the image display body 1 is not limited to the star shape.

In the image producing apparatus 50, plural kinds of transferable holograms may be prepared and the user may be allowed to select the desired hologram. In this case, the optimum gray-scale information may be previously set to each hologram and correlated with the hologram. The region to which the hologram is transferred may be previously determined. A printing unit which colors the base material 10 may be provided in the image producing apparatus 50.

In the hologram transfer sheet 60, it is not necessary to provide the peel layer 62 and the bonding layer 65 when the other layers have the sufficient peel properties or bonding properties. Other layers such as a surface lubricant layer may be provided if needed.

The invention relating to the second image display body 100 is not also limited to the above-described embodiment, and the second image display body 100 of the invention can be realized in various embodiments. For example, although the halftone dot 110 shown in FIG. 13 has the circular shape, the halftone dot 110 may have any shape such as an ellipse, a polygon, and an irregular shape. The image 102 is not limited to the star shape shown in FIG. 12 and may have any shape. The image 102 may be colored not a single color but plural colors. The image 102 may be provided in not apart of the base material 101 but the whole of the base material 101.

In the transfer sheet 120, the peel layer 122 is not required depending on the function of the base material sheet 121 or the optical diffraction structure layer 123. A layer except for the peel layer 122 may be laminated depending on the use application of the image display body 100. For example, a particular-color layer constituted by coloring ink such as gold is provided to the transfer sheet 120 to form the optical diffraction structure portion together with the optical diffraction structure layer 123.

Moreover, the transfer sheet 120 is designed such that the transfer sheet 120 is peeled off between the base material sheet 121 and the peel layer 122 to transfer the layers 122 to 125 including the optical diffraction structure layer 123 onto the transfer body 130. In some cases, the transfer sheet 120 may be designed such that the transfer sheet 120 is peeled off between the peel layer 122 and the optical diffraction structure layer 123 to transfer the layers 123 to 125 except for the peel layer 122 onto the transfer body 130. Additionally, the transfer sheet 120 may be designed such that the transfer sheet 120 is peeled off at the peel layer 122 into the side of the optical diffraction structure layer 123 and the side of the base material sheet 121.

The invention claimed is:

1. An image formation method in which an optical diffraction structure forming layer is thermally transferred in a halftone dot state to a colored region on a transfer body to form an optical diffraction structure portion by heating with a thermal head, a transfer sheet where the optical diffraction structure forming layer in which an optical diffraction structure is formed is laminated on a base material sheet thereof, including:
   setting a gray-scale information as a value of printing energy to be applied to the thermal head;
   determining as halftone dot information, positions and sizes of the halftone dots constituting the optical diffraction structure portion which are diffused by an error diffusion method based on the printing energy to be applied to the thermal head so that an area of the halftone dot is smaller than 0.25 mm$^2$ and a dot area percent to the colored region ranges from 15% to 60%; and
   transferring the optical diffraction structure forming layer in the halftone dot state by controlling a thermal head operation based on the halftone dot information.

2. The image formation method according to claim 1, wherein the colored region of the transfer body is colored a single color.

* * * * *